United States Patent

[11] 3,623,680

[72] Inventor Raymond K. Egnaczak
 Williamson, N.Y.
[21] Appl. No. 837,144
[22] Filed June 27, 1969
[45] Patented Nov. 30, 1971
[73] Assignee Xerox Corporation
 Rochester, N.Y.

[54] CLUTCH/BRAKE MECHANISM
 1 Claim, 5 Drawing Figs.
[52] U.S. Cl. ................................................ 242/201,
 242/67.4
[51] Int. Cl. ............................................. G11b 15/30
[50] Field of Search .................................. 242/201,
 205, 206, 207, 208, 209, 210, 67.4

[56] References Cited
UNITED STATES PATENTS

| 2,012,437 | 8/1935 | Segal | 242/67.4 |
| 2,675,974 | 4/1954 | Jones | 242/205 |
| 3,495,789 | 2/1970 | Gerfast | 242/201 |

FOREIGN PATENTS

| 822,446 | 11/1951 | Germany | 242/201 |

Primary Examiner—George F. Mautz
Attorneys—James J. Ralabate, Michael H. Shanahan and David C. Petre ABSTRACT: A commuter wheel is mounted on a threaded shaft between two pulleys. The pulleys are free to rotate on the shaft but are braced against movement along the axis of the shaft. The direction of shaft rotation determines which pulley is driven by the commuter wheel. The device is used to wind and rewind a tape between two spools.

PATENTED NOV30 1971          3,623,680
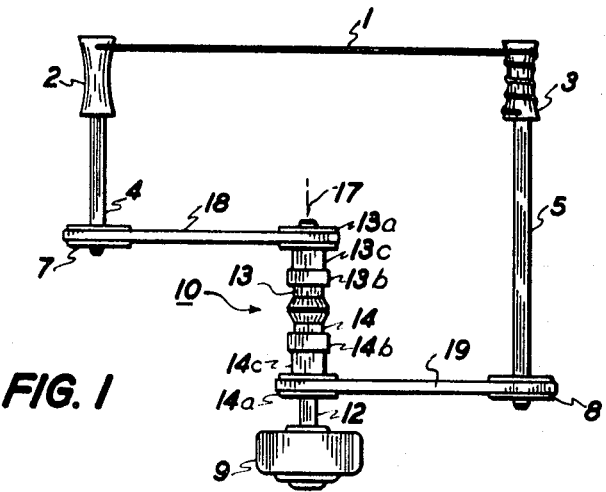
FIG. 1
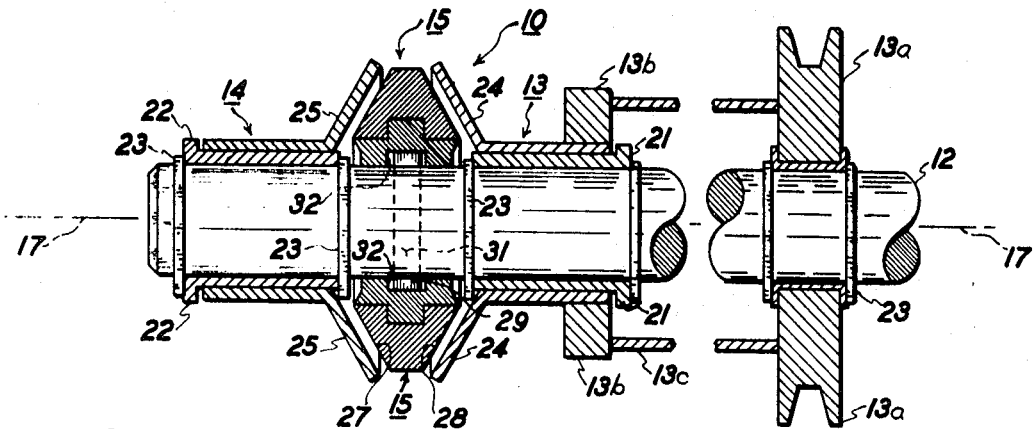
FIG. 2
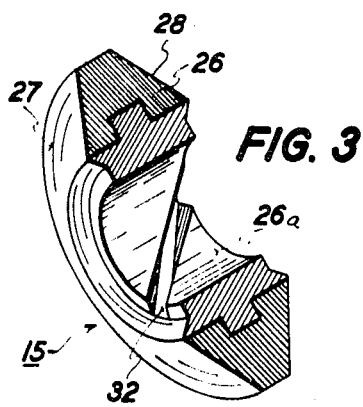
FIG. 3
FIG. 4a
FIG. 4b
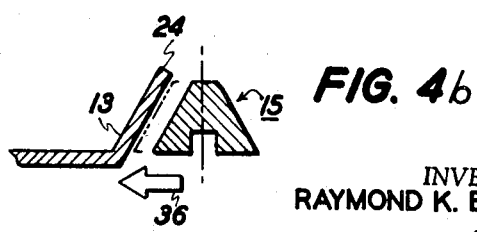
INVENTOR.
RAYMOND K. EGNACZAK
BY
*Michael H. Shanahan*
ATTORNEY

CLUTCH/BRAKE MECHANISM

BACKGROUND OF THE INVENTION

This invention relates generally to drive mechanisms and in particular to a novel clutch/brake device for a web wind and rewind mechanism.

In a web wind and rewind mechanism, a web (such as paper tape, magnetic tape, or cellulose film) is dispensed from a wind spool and taken up on a rewind spool. Heretofore, the repeated feeding of a web from one spool to another has required a complex array of gears and levers. The problems adding to the complexity of the drive system include the problem of switching power from one spool to the other. A critical part of this switching operation is the application of power to one spool substantially simultaneously with the removal of the power from the other. This simultaneous application and removal of power is desirable in order to prevent the exertion of excessive tensions on the web.

Accordingly, it is an object of this invention to overcome the above noted disadvantages. Specifically, it is an object of the present invention to devise a drive mechanism capable of transmitting the energy of a power shaft to a load member in response to the direction of rotation of the power shaft. Furthermore, it is an object of the invention to devise an improved and simplified web wind and rewind mechanism.

Another object of the present invention is to devise a clutch/brake mechanism engageable and releasable by the direction in which a shaft is rotating.

Even a further object of this invention is to devise means for increasing the mechanical couple between a clutch/brake and shaft in response to an increase in the load on the clutch/brake.

These and other objects of the present invention are accomplished by mounting a commuter wheel on a drive shaft between two pulleys. The pulleys or load members are mounted on the shaft in a manner permitting them to rotate freely relative to the shaft while being held against sliding movement along the axis of the shaft. The commuter wheel on the other hand is designed to slide along the shaft between the pulleys in addition to rotating with the shaft. The commuter wheel is internally grooved to mate with a pin or thread on the shaft. The commuter wheel is therefore a direction sensing member that not only rotates with the shaft but also moves back and forth along its axis as the shaft is switched between clockwise and counterclockwise rotation. The commuter wheel transmits the energy of the shaft to one or the other pulleys by moving into mechanical engagement with the pulley. The direction of shaft rotation determines the direction in which the commuter wheel moves along the shaft and therefore determines whether a particular pulley is engaged or released. In the web wind and rewind mechanism the direction sensing drive mechanism powers the rewind spool to feed out the web, releases the rewind spool for gentle braking when the power shaft is stopped and smoothly couples the wind spool to the power shaft when the direction of shaft rotation is reversed. At no time during this operation is excessive tension exerted on the web. To the contrary, the present drive mechanism offers foolproof protection for the web and thereby permits the web to be rapidly and safely switched between wind and rewind directions of travel.

DESCRIPTIONS OF THE DRAWINGS

Other advantages and features of the present invention will become apparent upon consideration of the detailed disclosure of the invention especially when taken in conjunction with the accompanying drawings wherein:

FIG. 1 is a schematic illustration of a web wind-rewind mechanism employing the present direction sensitive clutch/brake device;

FIG. 2 is a sectional view of the clutch/brake device taken through the axis of rotation of the power shaft;

FIG. 3 is an isolated, perspective view of a section of the clutch/brake commuter wheel; and FIG. 4a and b schematically illustrate the operation of the clutch/brake mechanism.

DESCRIPTION OF THE INVENTION

A web wind-rewind mechanism is shown in FIG. 1 with the web 1 being anchored by appropriate means at one end to the wind spool 2 and at another end to the rewind spool 3. The spools 2 and 3 are reels or bobbins between which the web 1 is wound and rewound. The spools 2 and 3 are coupled to the wind and rewind shafts 4 and 5 respectively which in turn are coupled to the wind and rewind pulleys 7 and 8. Power is transmitted to either the wind or rewind pulleys from the motor 9 through the direction sensing drive mechanism or clutch/brake 10.

The clutch/brake 10 includes the power shaft 12, the two load pulleys 13 and 14 and the commuter wheel 15. The commuter wheel is a direction sensing member mounted on the power shaft to rotate with the shaft and to slide back and forth along its axis 17 in response to clockwise and counterclockwise rotation of the power shaft 12.

The output pulleys 13a and 14a are rigidly connected to the load pulleys 13 and 14 by means of the collars 13b and 14b and the sleeves 13c and 14c. The collars are rigidly connected to the load pulleys by set screws or other appropriate means and are rigidly connected to the output pulleys by the sleeves. The sleeves have diameters larger than shaft 12 and are slidably fit over the shaft. Each sleeve is welded or otherwise rigidly connected between an output pulley and a collar. The output pulleys are journaled for rotation on shaft 12 by appropriate bearings to permit them to rotate with the load pulleys relative to the shaft.

The clutch/brake 10 is coupled to the wind pulley 7 by the continuous belt 18 looped over the wind pulley and the output pulley 13a. Likewise, the mechanism 10 is coupled to the rewind pulley 8 by the continuous belt 19 looped over the output pulley 14a and the rewind pulley 8. The power shaft 12 is coupled directly to the motor 9 by appropriate means.

The motor 9 is a mechanical energy source for rotating the power shaft 12 and may be any suitable driving device or mechanism. Preferably, the motor 9 is a shunt wound DC electric motor. The armature of the motor 9 is connected directly to the power shaft 12 and is capable of being dynamically braked and rapidly reversed in direction of rotation.

Turning now to FIG. 2, the load pulleys 13 and 14 are journaled for rotation on shaft 12 by the bearings 21 and 22. The bearings and therefore the load pulleys are braced against movement along the axis 17 of the shaft 12 by the retaining rings 23 (at four places). Therefore, the load pulleys 13 and 14 can rotate relative to shaft 12 and are locked against movement along the axis of the shaft.

The load pulleys 13 and 14 have the angled flanges 24 and 25 respectively which are sloped in the direction of the axis 17 toward one another at substantially the same angle. The commuter wheel 15 is mounted on the shaft 12 between the flanges 24 and 25. The cross-sectional view of the commuter wheel in FIGS. 2 and 3 reveal its metal rim 26a and the tire 26. The surfaces 27 and 28 of the tire portion 26 are sloped at an angle substantially equal to or greater than the angle defining the slope of the flanges 24 and 25.

Surfaces 27 and 28 are friction surfaces designed to frictionally engage the sloped flanges 24 and 25 and thereby rotate the load pulleys with the commuter wheel. Obviously, the commuter wheel engages only one load pulley at a time. The slopes chosen for the flanges and the friction surfaces are intended to increase the mechanical engagement between the commuter wheel and load pulley. First of all, the commuter wheel 15 is caused to move against a flange of a load pulley because of the rotation of the shaft 12. As the rotational speed of shaft 12 is increased, the force between the load pulley and the commuter wheel is increased. In addition, the slopes of the flange and of the friction surfaces increase the mechanical engagement between the commuter wheel and load pulley even more. The sloped friction surface is a wedge which behaves similarly to a doorstop slipped under the crack of a door to keep it from shutting. Consequently, the harder the friction surface is forced against a flange the greater becomes the mechanical couple between the commuter wheel and the load pulley.

Commuter wheel 15 is coupled to the power shaft 12 by the pin or thread 29. The pin 29 is fit into the slot 31 drilled through the shaft 12 and protrudes beyond the shaft on both sides. The rim portion 26a of the wheel has two grooves 32 positioned 180° apart on the inside of the rim 26a which mate with the two protruding ends of pin 29. The grooves are generally helical and are skewed relative to the axis 17. When the shaft 12 is rotated the pin 29 not only rotates wheel 15 but also displaces the wheel along the axis of the shaft. The grooves 32 and the pin 29 effectively make the commuter wheel 15 and shaft 12 functionally equivalent to a nut and bolt. The wheel is like a nut in that it has a spiral or helical groove and the shaft is like a screw in that it has a thread, i.e. the pin. Clockwise and counterclockwise rotation of the shaft (the screw) causes the wheel (the nut) to advance back and forth along the length of the screw.

FIGS. 4a and b illustrate the forces causing the commuter wheel to rotate and translate along the axis of the shaft 12. The pin 29 is inserted into groove 32 and exerts a force on the wheel in the direction of shaft rotation thereby rotating the wheel with the shaft. The slope or pitch of the groove 32 relative to the axis 17 gives rise to a force component parallel to the axis 17 that translates the wheel along the axis. The parallel force component causes the wheel to move along the axis 17 in a direction determined by the slope of the groove 32 relative to the direction of rotation. The rotation direction indicated by arrow 34 and the slope or pitch of the groove 32 indicated by angle C cause the wheel 15 to move to the left as indicated by the arrow 36. In the case described, the wheel is caused to engage the load pulley 13 thereby winding web 1 from spool 3 onto spool 2.

The operation of the web wind and rewind mechanism of FIG. 1 begins by energizing motor 9. The armature of the motor 9 is rotated counterclockwise to wind the web from spool 3 onto spool 2. The motor imparts a counterclockwise rotation to the power shaft 12 causing the commuter wheel to move toward and engage the load pulley 13. The load pulley 13, the collar 13b, sleeve 13c, output pulley 13a and belt 18 transmit the energy of the motor to the wind pulley 7, wind shaft 4, and ultimately spool 3. An operator action stops the motor 9 causing the shaft 12 to decelerate. The deceleration of the shaft 12 initiates the separation of the commuter wheel friction surface 27 from the flange 24 thereby removing the driving power of motor 9 from the load pulley 13. The commuter wheel begins a definite movement toward the load pulley 14 when the shaft is rotated in the clockwise direction.

The commuter wheel friction surface 28 engages flange 25 to rotate the load pulley 14, and thereby drive collar 14b, sleeve 14c, output pulley 14a, belt 19, pulley 8, shaft 5 and ultimately rewind spool 3. Consequently, the web 1 is fed from spool 2 onto spool 3. Subsequent changes in the direction of rotation of shaft 12 effect like changes in the direction of the web 1 back and forth between the spools 2 and 3.

The clutch/brake mechanism 10 can be readily adapted to machines other than the wind-rewind mechanism of FIG. 1. Only one load pulley or similar member need be employed in the clutch/brake since the engagement of each load pulley is dependent on a particular direction of shaft rotation. The relative position of the load pulley and commuter wheel can be interchanged such that the pulleys move in and out of engagement with a stationary commuter wheel rather than vice versa. Also, the shaft can be grooved rather than threaded and the commuter wheel threaded rather than grooved. The name clutch/brake is given to the devise 10 because the selective engagement of the load pulleys to the power shaft can be arranged to brake a load rather than power it. The foregoing remarks and observations make it apparent that modifications can be made to the present invention without departing from the spirit or scope thereof.

What is claimed is:

1. In a web wind-rewind mechanism wherein mechanical energy is alternately coupled to first and second spools between which a web is wound back and forth, the improvement being a direction sensing drive mechanism for alternately coupling mechanical energy to a spool comprising a shaft supported for rotation and for coupling to a mechanical energy source, first and second load pulleys coupled to said first and second spools respectively, journaled for rotation on said shaft, locked against movement along the shaft axis of rotation and having conically shaped flanges sloped toward one another at substantially equal angles relative to said shaft axis, and a commuter wheel mounted over the shaft between the first and second pulleys including a rim having a helical groove mated with a thread member on the shaft for rotating the wheel and moving it along said shaft axis toward the first pulley when the shaft is rotated clockwise and toward the second pulley when rotated counterclockwise and a replaceable rigidly mounted around the rim having first and second conically shaped friction surfaces facing the sloped flanges on said first and second pulleys respectively, sloped at angles relative to said shaft axis equal to or greater than the angle at which an adjacent flange is sloped for enabling a friction surface to drivingly couple rotation of said shaft to a pulley and spool.

* * * * *